(12) United States Patent
Venkatesan et al.

(10) Patent No.: US 7,175,751 B2
(45) Date of Patent: Feb. 13, 2007

(54) METHOD AND APPARATUS FOR ELECTROREFINING IMPURE HYDROGEN

(75) Inventors: Srinivasan Venkatesan, Southfield, MI (US); Hong Wang, Troy, MI (US); Subhash K. Dhar, Bloomfield, MI (US); Stanford R. Ovshinsky, Bloomfield Hills, MI (US)

(73) Assignee: Ovonic Fuel Cell Company LLC, Rochester Hills, MI (US)

( * ) Notice: Subject to any disclaimer, the term of this patent is extended or adjusted under 35 U.S.C. 154(b) by 500 days.

(21) Appl. No.: 10/427,272

(22) Filed: May 1, 2003

(65) Prior Publication Data

US 2004/0217015 A1 Nov. 4, 2004

(51) Int. Cl.
*C25B 1/02* (2006.01)
(52) U.S. Cl. .................. 205/639; 205/637; 205/763; 204/277; 204/278
(58) Field of Classification Search ............. 205/763, 205/765, 637, 639; 204/265, 266, 277, 278
See application file for complete search history.

(56) References Cited

U.S. PATENT DOCUMENTS

| | | | |
|---|---|---|---|
| 4,544,473 A | 10/1985 | Ovshinsky | |
| 4,545,883 A | 10/1985 | Ovshinsky | |
| 6,168,705 B1 * | 1/2001 | Molter et al. | ............... 205/637 |
| 6,261,528 B1 | 7/2001 | Carrea | |
| 6,280,865 B1 * | 8/2001 | Eisman et al. | ................ 429/17 |
| 6,436,352 B1 | 8/2002 | Succi | |
| 6,464,756 B1 | 10/2002 | Plee | |
| 6,494,937 B1 | 12/2002 | Edlund | |
| 6,511,521 B1 | 1/2003 | Parchamazad | |
| 6,685,821 B2 * | 2/2004 | Kosek et al. | ............... 205/637 |

* cited by examiner

*Primary Examiner*—Arun S. Phasge
(74) *Attorney, Agent, or Firm*—David W. Schumaker; Marvin S. Siskino

(57) ABSTRACT

A method and system for electrochemically purifying an impure stream of hydrogen. Hydrogen is absorbed into a gas diffusion anode from the impure hydrogen stream and oxidized to form hydrogen ions and electrons which are released into an alkaline solution. An electrolytic cathode also positioned in the alkaline solution decomposes water to form hydrogen and hydroxyl ions which combine with the hydrogen ions to maintain equilibrium of the system.

30 Claims, 6 Drawing Sheets

METHOD AND APPARATUS FOR ELECTROREFINING IMPURE HYDROGEN

FIELD OF THE INVENTION

The present invention relates generally to a method and system for purifying an impure stream of hydrogen. More particularly, the present invention relates to a system for electrochemically purifying an impure stream of hydrogen.

BACKGROUND

Considerable attention has been given to the use of hydrogen as a fuel or fuel supplement. While the world's oil reserves are rapidly being depleted, the supply of hydrogen remains virtually unlimited. Hydrogen, although presently more expensive than petroleum, is a relatively low cost fuel. Hydrogen has the highest density of energy per unit weight of any chemical fuel and is essentially non-polluting since the main by-product of burning hydrogen is water. Hydrogen is typically used as a chemical reducer in industrial processes or as a fuel to power fuel cells or hydrogen combustion engines, which in turn provide power to vehicles or other applications. To operate efficiently, such applications require a highly pure stream of hydrogen, free from impurities such as carbon dioxide or carbon monoxide. Contaminated hydrogen streams containing such impurities can greatly reduce the lifetime and operating efficiency of a fuel cell. Contaminated hydrogen streams may also dramatically affect the operating efficiency of hydrogen combustion engines resulting in shorter ranges for vehicle applications.

Hydrogen is also widely used as a reactant for chemical or food production. Examples of foods requiring hydrogen for processing are edible fats and oils. Typically unsaturated fats and oils are hydrogenated with hydrogen in the presence of a catalyst. Petroleum refineries use increasing quantities of hydrogen to meet regulatory requirements on diesel, gasoline, and other petroleum products. Petroleum refineries also use hydrogen to form gasoline from crude oil. Such reactions typically require highly pure sources of hydrogen to be effectively carried out. Pure hydrogen is also a necessity in the semiconductor industry where increasing line densities require hydrogen of the utmost purity. Impure hydrogen can be adverse to such reactions, especially in wide scale manufacturing processes, as the impurities can react to produce unwanted side products, which must be removed from the final product, or reduce the reaction efficiency, resulting in higher production costs. Several metallurgical operations are carried out in reducing atmospheres. Depending upon the application, they require different levels of hydrogen purity.

Typically, hydrogen is produced by a variety of methods such as water electrolysis, steam reforming, cracking hydrocarbons, or cracking ammonia. The methods using fossil fuels have a built in disadvantage in that the hydrogen streams produced by such methods contain contaminates such as carbon monoxide, carbon dioxide, methane, and various hydrocarbons. When producing hydrogen from fossil fuels, the hydrogen that is produced usually needs to be dried and cleaned of all contaminants before being used for many applications.

Different measures have been taken to remove various contaminants from hydrogen streams. Apart from adding a Stage 2 reformer, where the contaminants of Stage 1 are purified, there are other methods have been used to attempt to purify the hydrogen stream. To remove carbon monoxide, methods such as selective oxidation of CO in the presence of a catalyst are presently used, however, this results in a build-up of $CO_2$ within the hydrogen stream. Selective adsorption of impurities in the impure hydrogen stream via Pressure Swing Adsorption to provide a pure hydrogen stream is also used, however, while this results in a product with a high purity, not all of the impurities are removed. Other methods used to remove contaminants utilize conventional metallic membranes or hydrogen permeable membranes to purify hydrogen, but purification is not 100%, so they may also require the use of a methanation catalyst, which catalyzes the conversion of CO to methane ($CH_4$). While the presence of methane in the hydrogen stream may be suitable in some systems, other systems may be adversely affected by its presence. Hydrogen getter materials have also been used to purify hydrogen streams but they require operating temperatures above 250° C. and some of the contaminants still remain in the hydrogen stream after "purification". Therefore, a system that can effectively purify an impure stream of hydrogen by removing contaminants contained in the impure stream will be highly desirable and have widespread uses for a variety of applications.

SUMMARY OF THE INVENTION

The present invention discloses a hydrogen purification system comprising a gas receiving chamber adapted to receive a gaseous stream of impure hydrogen, an alkaline solution, a source of power for providing an electrical current, a gas diffusion anode adjacent to the gas receiving chamber having a gas interface in contact with the gaseous stream of impure hydrogen and an electrolyte interface in contact with the alkaline solution, wherein hydrogen from the gaseous stream of impure hydrogen is absorbed into the gas diffusion anode, an electrolytic cathode in contact with the alkaline solution adapted to receive the electrical current and to produce a supply of hydrogen upon receipt of said electrical current.

The gas receiving chamber comprises an input for receiving the gaseous stream of impure hydrogen and an output for venting an outlet stream containing contaminants from the stream of impure hydrogen and hydrogen not absorbed by said gas diffusion anode. The outlet stream may also be fed into a hydrogen separator adapted to separate the outlet stream into a hydrogen stream containing mostly hydrogen and a waste stream containing mostly contaminants. The resulting hydrogen stream may then be fed into the impure hydrogen stream and the waste stream may be vented to the atmosphere or collected.

The gas diffusion anode is comprised of a gas diffusion layer, an active material layer, and at least one current collector grid. The gas diffusion layer may be adapted to distribute the impure stream of hydrogen across the active material layer. The active material layer of the gas diffusion electrode generally comprises a hydrogen storage alloy selected from rare-earth/Misch metal alloys, zirconium and/or titanium alloys or mixtures thereof. The active material layer may further comprise a material catalytic towards the dissociation of molecular hydrogen into atomic hydrogen. The current collector grid may be a metal sheet, expanded metal, foil, wire mesh, screen, or combination thereof.

The electrolytic cathode comprises a substrate with a material catalytic towards the decomposition of water to form hydrogen and hydroxyl ions deposited thereon. The catalytic material may comprise a host matrix including one or more elements selected from Ni, Mo, Co, or combinations thereof. The catalytic material may further comprise one or more modifier elements selected from Ti, Mo, Ta, Zn, Cr, Nb, Fe, V, Cu Sr, Si, La, Ce, O, Co, Al, C, Ru, Misch metal, or combinations thereof. The substrate is selected from a metal sheet, expanded metal, foil, wire mesh, screen, or combinations thereof formed from a material selected from nickel, steel, titanium, graphite, copper, or mixtures thereof.

The gas diffusion anode may be in electrical communication with the source of power thereby supplementing the source of power with an electrical current produced from the oxidation of the absorbed hydrogen at said electrolyte interface of the gas diffusion anode.

The present invention also discloses a method for purifying an impure stream of hydrogen comprising the steps of 1) contacting a gas diffusion anode including a hydrogen storage alloy in contact with an alkaline electrolyte with an impure stream of hydrogen, 2) absorbing hydrogen from the impure stream of hydrogen into the hydrogen storage alloy of the gas diffusion anode, 3) oxidizing the absorbed hydrogen to release hydrogen ions into the alkaline electrolyte, 4) supplying an electric current from a source of power to an electrolytic cathode in contact with the alkaline solution to produce a supply of pure hydrogen and hydroxyl ions, and 5) collecting the supply of pure hydrogen.

A second embodiment of the present invention discloses a hydrogen production and purification system comprising a hydrogen reformer adapted to produce a gaseous stream of impure hydrogen from a hydrogen containing organic compound, such as natural gas, a source of heat adapted to provide heat to the hydrogen reformer to produce the gaseous stream of impure hydrogen, a gas receiving chamber adapted to receive the gaseous stream of impure hydrogen, an alkaline solution, a source of power for providing an electrical current, a gas diffusion anode adjacent to the gas receiving chamber having a gas interface in contact with the gaseous stream of impure hydrogen and an electrolyte interface in contact with the alkaline solution, wherein hydrogen from the gaseous stream of impure hydrogen is absorbed into the gas diffusion anode, and an electrolytic cathode in contact with said alkaline solution adapted to receive said electrical current and to produce a supply of hydrogen upon receipt of said electrical current.

The gas receiving chamber comprises an input for receiving the gaseous stream of impure hydrogen and an output for venting an outlet stream containing contaminants from the stream of impure hydrogen and hydrogen not absorbed by the gas diffusion anode.

The source of power may be a power generator powered by the combustion of the outlet stream, and the source of heat may be a combustor fueled by the outlet stream.

The outlet stream may also be fed into a hydrogen separator adapted to separate the outlet stream into a hydrogen stream containing mostly hydrogen and a waste stream containing mostly contaminants, with the hydrogen stream being recycled into the impure stream of hydrogen.

The gas diffusion anode may comprise a gas diffusion layer, an active material layer, and at least one current collector grid. The gas diffusion layer may be adapted to distribute the impure stream of hydrogen across the active material layer. The active material comprises a hydrogen storage alloy selected from rare-earth/Misch metal alloys, zirconium and/or titanium alloys, magnesium/nickel alloys, or mixtures thereof. The active material layer may also comprise a material catalytic towards the dissociation of molecular hydrogen into atomic hydrogen.

The electrolytic cathode comprises a substrate with a material catalytic towards the decomposition of water to form hydrogen and hydroxyl ions deposited thereon. The catalytic material comprises a host matrix including one or more elements selected from Ni, Mo, Co, or combinations thereof. The catalytic material may further comprise one or more modifier elements selected from Ti, Mo, Ta, Zn, Cr, Nb, Mn, Fe, V, Cu Sr, Si, La, Ce, O, Co, Al, C, Ru, Misch metal, Raney Nickel, or combinations thereof.

The gas diffusion anode may be in electrical communication with the source of power thereby supplementing the source of power with an electrical current produced from the oxidation of the absorbed hydrogen at the electrolyte interface of the gas diffusion anode.

DETAILED DESCRIPTION OF THE INVENTION

Figure 1:
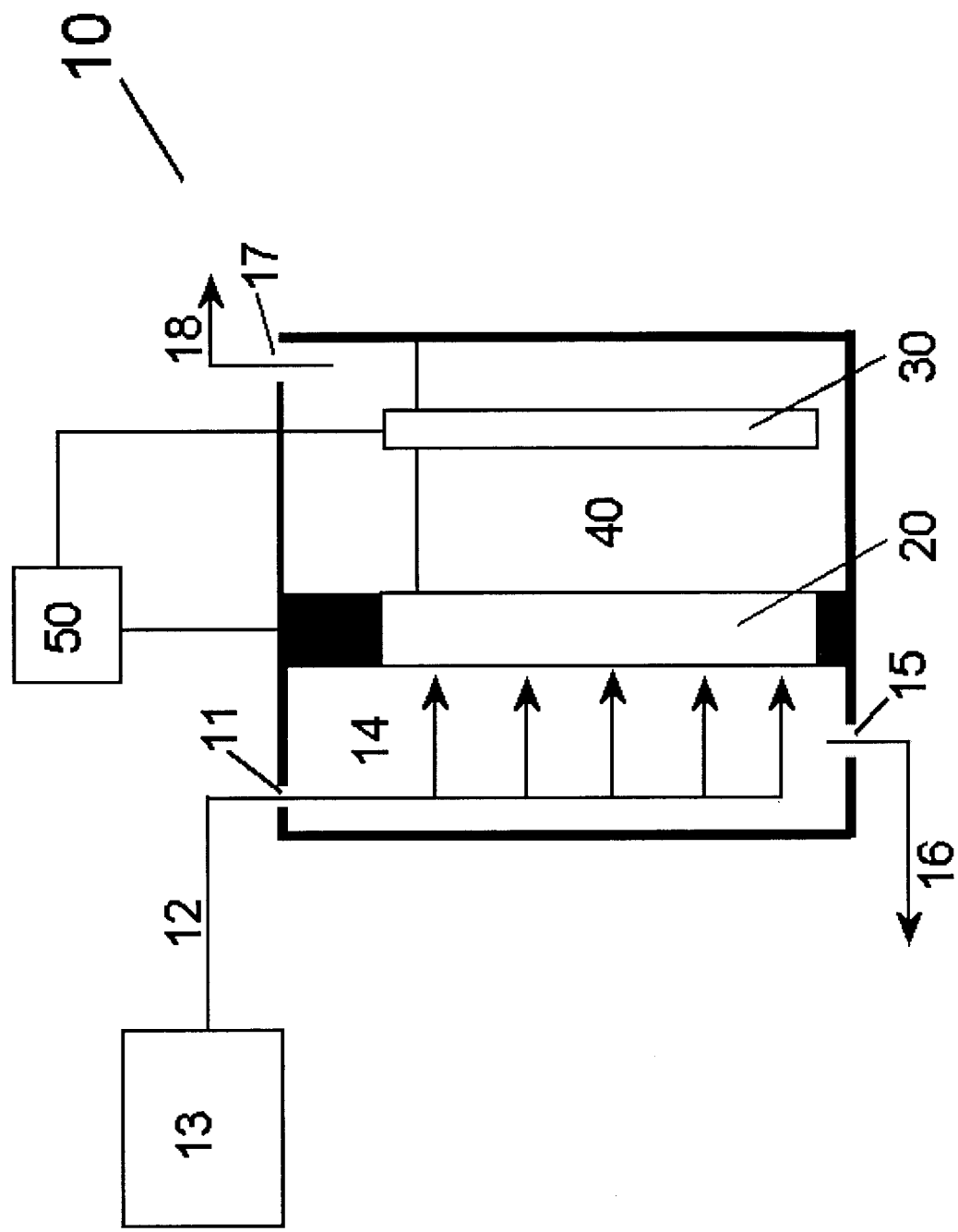
FIG. 1, is a depiction of a first embodiment of the present invention.

The present invention provides a method and system for purifying an impure hydrogen stream containing any number of gaseous contaminants. An embodiment of the hydrogen purification system of the present invention is shown in FIG. 1. The system 10 includes an input 11 for receiving an impure hydrogen stream 12 from a source of impure hydrogen 13, a gas receiving chamber 14, an output 15 for venting a contaminant rich gas stream 16 out of the gas receiving chamber 14, and an output 17 for providing a purified hydrogen stream 18. The system also includes at least one gas diffusion anode 20, at least one electrolytic cathode 30, and a power source 50 for supplying power to the electrodes. The power source 50 may be any means for supplying an electrical current such as a battery, a power outlet, or a generator. The power source 50 may also be a generator powered by the combustion of the contaminant gases contained in the impure hydrogen stream such as methane ($CH_4$) or other hydrocarbons. The power source may also be supplemented by an electrical current supplied from the gas diffusion anode. Both the anode and cathode are positioned in an alkaline solution bath 40, which may be comprised of a 15 to 30 weight percent KOH solution. The system operating temperature is in the range of 70° C. to 90° C. The system may be installed at a central facility or may be a portable unit that can be added on at any user site.

Figure 2:
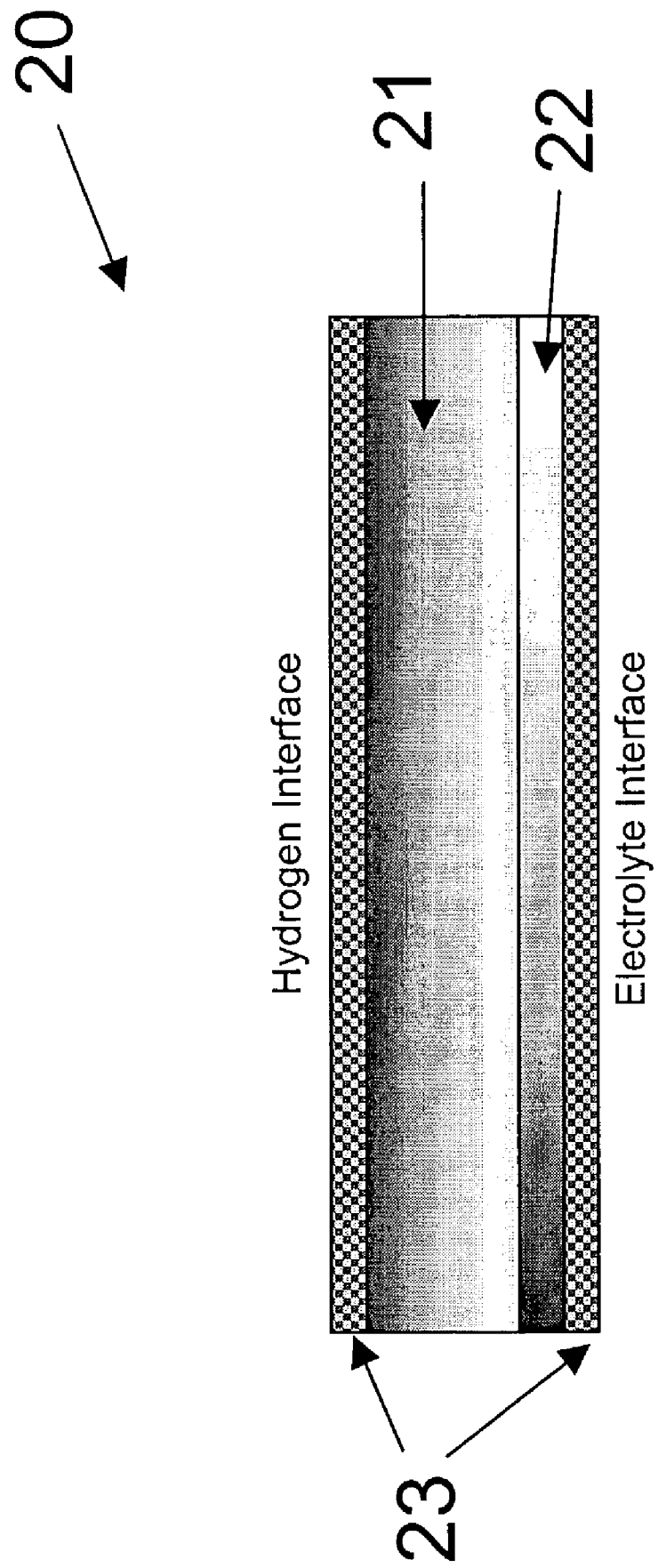
FIG. 2, is a depiction of a gas diffusion anode in accordance with the present invention.

The gas diffusion anode 20 in accordance with the present invention is depicted in FIG. 2. The gas diffusion anode has a gas diffusion layer 21 and an active material layer 22 supported by at least one current collector grid 23. The layered structure promotes uniform hydrogen distribution across the face of the gas diffusion anode and absorption of the hydrogen into the active material layer. The gas diffusion layer 21 and the active material layer 22 are placed adjacent to one another at least one current collector grid 23 being placed adjacent to the gas diffusion layer and/or the active material layer. The active material layer 22 is in contact with the alkaline solution while the gas diffusion layer 21 is in contact with the impure hydrogen stream 12. While the preferred embodiment of the invention includes a gas diffusion layer and an active material layer, alternative embodiments of the invention may include additional active material layers or gas diffusion layers to vary the hydrophobicity within the anode as needed.

The gas diffusion anode 20 needs a barrier means to isolate the electrolyte, or wet, side of the gas diffusion anode from the gaseous, or dry, side of the gas diffusion anode. A beneficial means of accomplishing this is by inclusion of a hydrophobic component comprising a halogenated organic (fluoro)polymer compound, particularly polytetrafluoroethylene (PTFE) within the gas diffusion layer 21 of the gas diffusion anode to prevent the electrolyte from entering the gas diffusion layer from the active material layer. With this in mind, the gas diffusion layer 21 is primarily a carbon matrix composed of carbon particles coated with polytetrafluoroethylene. The carbon matrix is in intimate contact with a current collector grid which provides mechanical support to the carbon matrix. The carbon particles may be carbon black known as Vulcan XC-72 carbon (Trademark of Cabot Corp.), which is well known in the art. The gas diffusion layer 21 may contain approximately 20–60 percent by weight polytetrafluoroethylene with the remainder consisting of carbon particles. The use of carbon particles rather than materials like nickel in the gas diffusion layer allows the amount of polytetrafluoroethylene to vary as needed up to 60 weight percent without clogging the pores in the gas diffusion layer. The polytetrafluoroethylene concentration within the gas diffusion layer may also be continually graded from a high concentration at the side of the gas diffusion layer contacting the active material layer to a low concentration at the side of the gas diffusion layer contacting the current collector grid.

The active material layer 22 of the gas diffusion anode 20 is generally a hydrogen storage material optionally including a catalytic material. The preferable active material layer is one which can reversibly absorb and release hydrogen irrespective of the hydrogen storage capacity and has the properties of a fast hydrogenation reaction rate, a good stability in the electrolyte, and a long shelf-life. It should be noted that, by hydrogen storage capacity, it is meant that the material stores hydrogen in a stable form, in some nonzero amount higher than trace amounts. Preferred materials will store about 1.0 weight % hydrogen or more. Preferably, the alloys include, for example, rare-earth alloys, Misch metal alloys, zirconium and/or titanium alloys, magnesium/nickel alloys, or mixtures thereof. The active material layer may even be layered such that the material on the hydrogen contacting surface of the active material layer is formed from a material which has been specifically designed to be highly catalytic to the dissociation of molecular hydrogen into atomic hydrogen, while the material on the electrolyte contacting surface is designed to be highly catalytic to the oxidation of hydrogen.

Preferably, the hydrogen storage material is designed to have a high density of active catalytic sites, resistance to poisoning, and long operating life. These hydrogen storage alloys contained within the active material layer are resistant to poisoning from contaminants like carbon monoxide, carbon dioxide, nitrogen, etc, due to their highly disordered state providing more active sites than pure crystalline materials. An example of these types of alloys are disclosed in U.S. Pat. No. 4,551,400, the disclosure of which is hereby incorporated by reference.

The active material layer 22 of the gas diffusion anode may further include leachable elements such as aluminum or zinc. Upon exposure to an alkaline solution, the leachable elements are dissolved out of the active material layer resulting in a highly porous active material layer allowing greater accessibility to reactive sites within the active material layer.

The current collector grid 23 may be a metal sheet, expanded metal, foil, wire mesh, or screen. The current collector grid may be formed from nickel, steel, titanium, graphite, copper, or mixtures thereof. Other materials may also be used providing they have a high conductivity and resistance to breakdown upon exposure to the conditions within the electrolytic cell. An example of a gas diffusion anodes as used in accordance with the present invention is disclosed in U.S. patent application Ser. No. 10/273,509, to Ovshinsky et al., entitled "MULTIPLE LAYER HYDROGEN ELECTRODE", the disclosure of which is herein incorporated by reference.

The electrolytic cathode 30 in accordance with the present invention generally comprises a material catalytic towards the decomposition of water to hydrogen and hydroxyl ions supported on a substrate. The catalytic material may be comprised of a host matrix formed from transition elements such as Ni, Me, or Co. Modifier elements such as Ti, Mo, Ta, Zn, Cr, Nb, Mn, Fe, V, Cu Sr, Si, La, Ce, O, Co, Al, C, Ru, Misch metal, Raney Nickel, or combinations thereof may be incorporated into the host matrix to provide a material having an increased density of catalytically active sites. The substrate may be a metal sheet, expanded metal, foil, wire mesh, or screen. The substrate may be formed from nickel, steel, titanium, graphite, copper, or mixtures thereof. Other materials may also be used providing they have a high conductivity and resistance to breakdown upon exposure to the conditions within the electrolytic cell. The catalytic material may be applied onto the substrate via sputtering, vapor deposition, plasma deposition, or spraying. Examples of cathodes for use in electrolysis cells are disclosed in U.S. Pat. Nos. 4,544,473 and 4,545,883, the disclosures of which are herein incorporated by reference.

During operation, the impure hydrogen stream 12 is fed into a gas receiving chamber 14 of the purification system 10. The impure hydrogen stream 12 first contacts the gas contacting side of the gas diffusion anode 20 and is diffused through the gas diffusion layer 21 to contact the active material layer 22. Hydrogen contained in the impure hydrogen stream 12 is absorbed into the active material layer 22 of the gas diffusion anode 20 leaving the impurities behind in the gas receiving chamber 14. The remaining contaminant rich gas stream 16 then exits the gas receiving chamber 14 with any hydrogen not absorbed into the active material layer 22 of the gas diffusion anode 20. The gas receiving chamber 14 may be maintained as a constant pressure and/or the flow of the impure hydrogen stream may be varied to allow most of the hydrogen contained within the impure hydrogen stream to be absorbed into the gas diffusion anode.

Once absorbed into the active material layer 22 of the gas diffusion anode 20, the hydrogen is oxidized at the electrolyte interface producing electrons and hydrogen ions upon contacting the alkaline solution 40. The hydrogen ions are released into the electrolyte solution 40, and the electrons travel up through the gas diffusion anode and are supplied to the electrolytic cathode to supplement to the current from the power source 19. As oxidation of hydrogen is occurring at the electrolyte interface of the gas diffusion anode 20, current is supplied to the electrolytic cathode 30 from a power source and the gas diffusion anode to evolve hydrogen. At the electrolytic cathode 30, water is decomposed to form hydroxyl ions and pure molecular hydrogen via electrolysis. Within the alkaline solution 40 the hydrogen ions and hydroxyl ions combine to form water thereby maintaining the system at equilibrium. As the pure hydrogen is formed, it is supplied to end users or collected and stored in gaseous, liquid, or metal hydride form.

Figure 3:
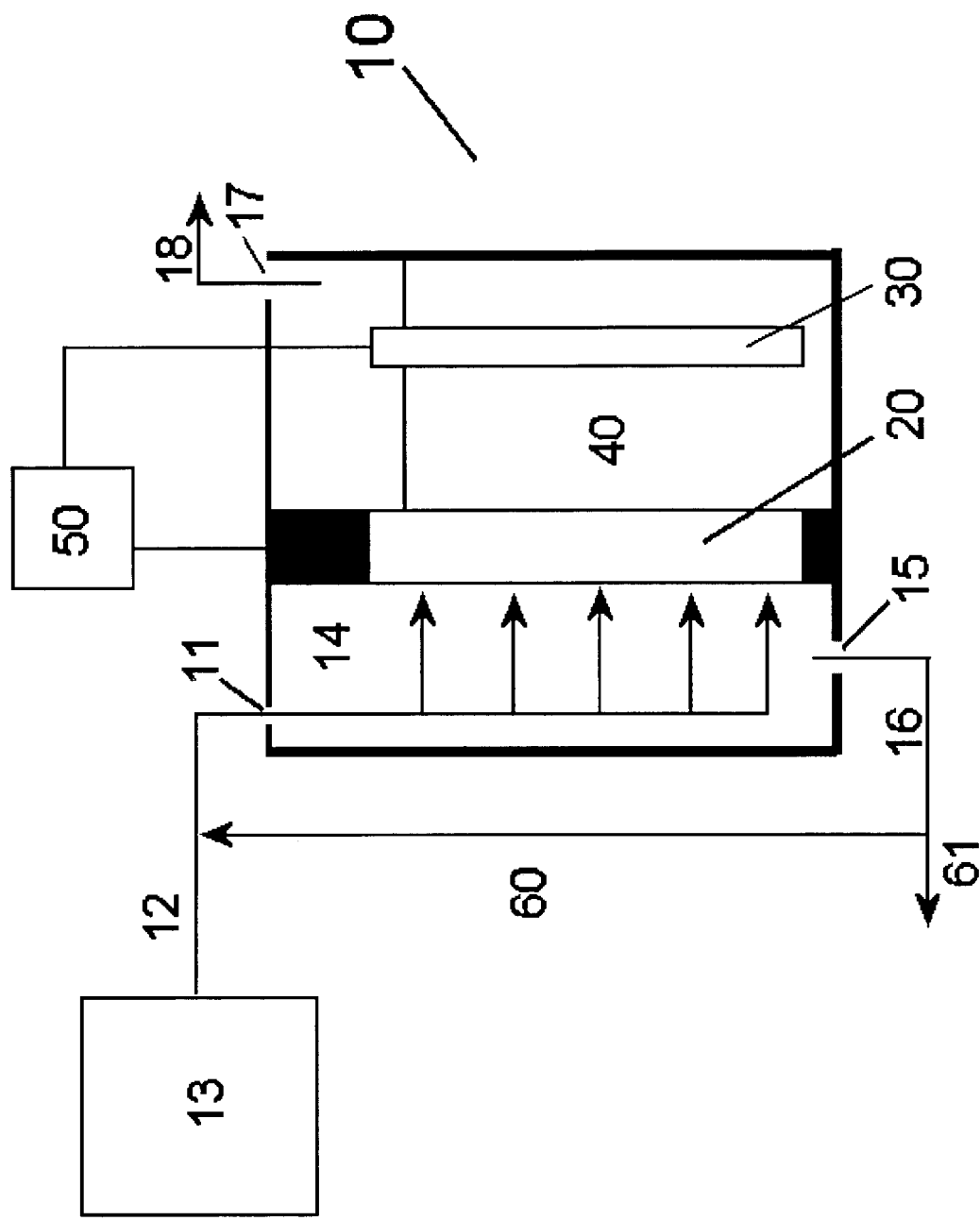
FIG. 3, is a depiction of a second embodiment of the present invention.

In a second embodiment of the present invention shown in FIG. 3, the contaminant rich gas stream 16 exiting the gas receiving chamber 14 may be recycled into the impure hydrogen stream entering the purification system via a recycle stream 60 and enter the gas receiving chamber 14. This embodiment is used to recover any hydrogen exiting the gas receiving chamber with the contaminant gases. To prevent a buildup of contaminant gases within the purification system, a control system may be utilized to measure the concentration of hydrogen in the stream exiting the gas receiving chamber, whereby the gas exiting the gas receiving chamber is purged from the system through a purge stream 61 when the concentration of hydrogen falls below a predetermined level.

Figure 4:
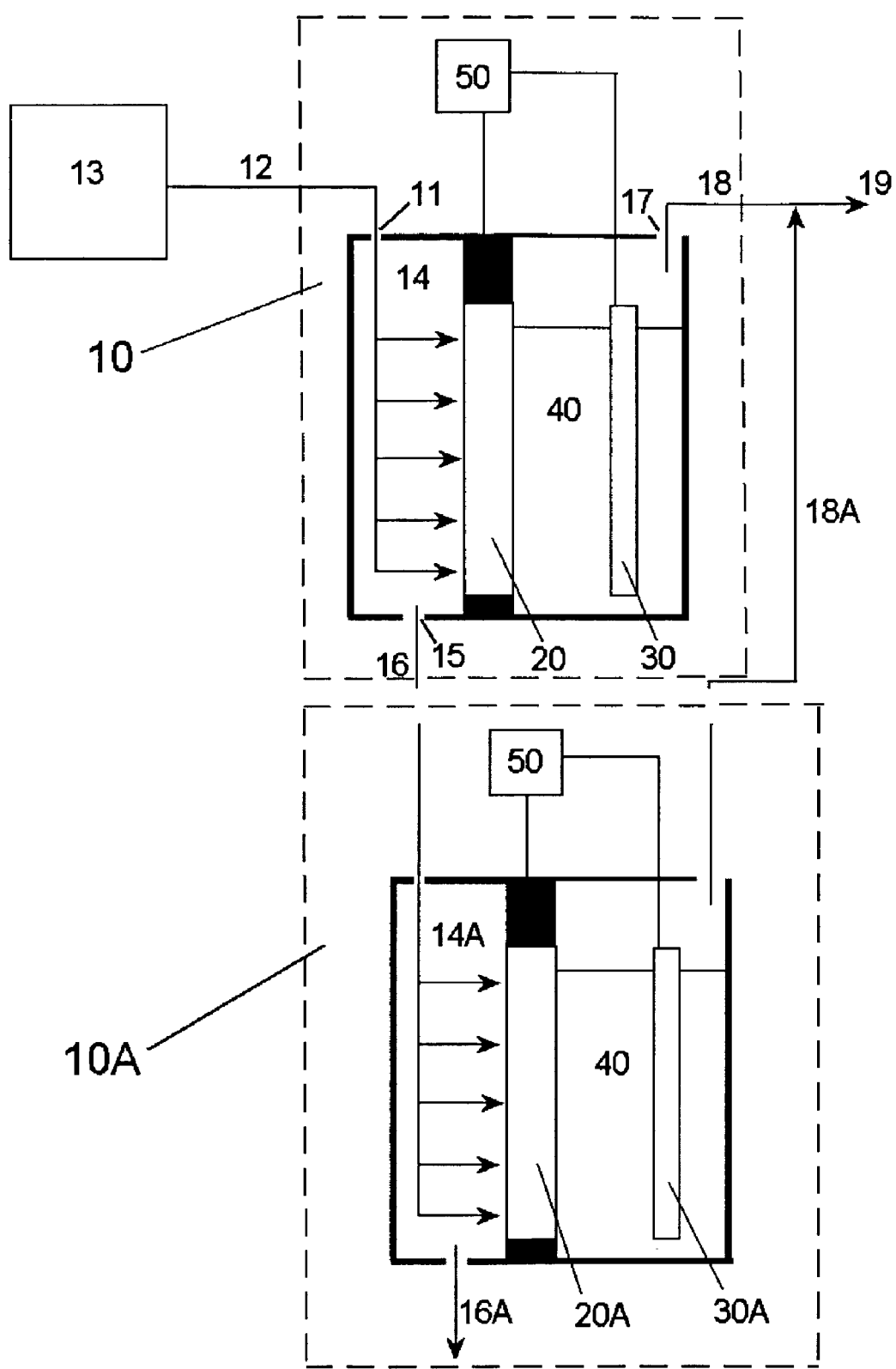
FIG. 4, is a depiction of a third embodiment of the present invention.

In a third embodiment of the present invention as shown in FIG. 4, two or more purification systems in accordance with the present invention may be used to conserve a majority of all hydrogen contained in the impure hydrogen stream. In this embodiment, the contaminant rich gas exiting the gas receiving chamber 14 of the first hydrogen purification system 10 is input into a second gas receiving chamber 14A in a second hydrogen purification system 10A in accordance with the present invention. The contaminant rich stream 16 enters the second gas receiving chamber 14A and the hydrogen from the stream is absorbed into the gas diffusion anode 20A and a pure stream of hydrogen is produced at the electrolytic cathode 30A in the same manner as described above. The contaminant rich stream 16A then exits the second gas receiving chamber 14A and is vented, collected, or further processed to remove any additional hydrogen if feasible while the resulting hydrogen stream 18A is combined with the hydrogen stream 18 leaving the first purification system 10 to form a combined pure hydrogen stream 18C.

Figure 5:
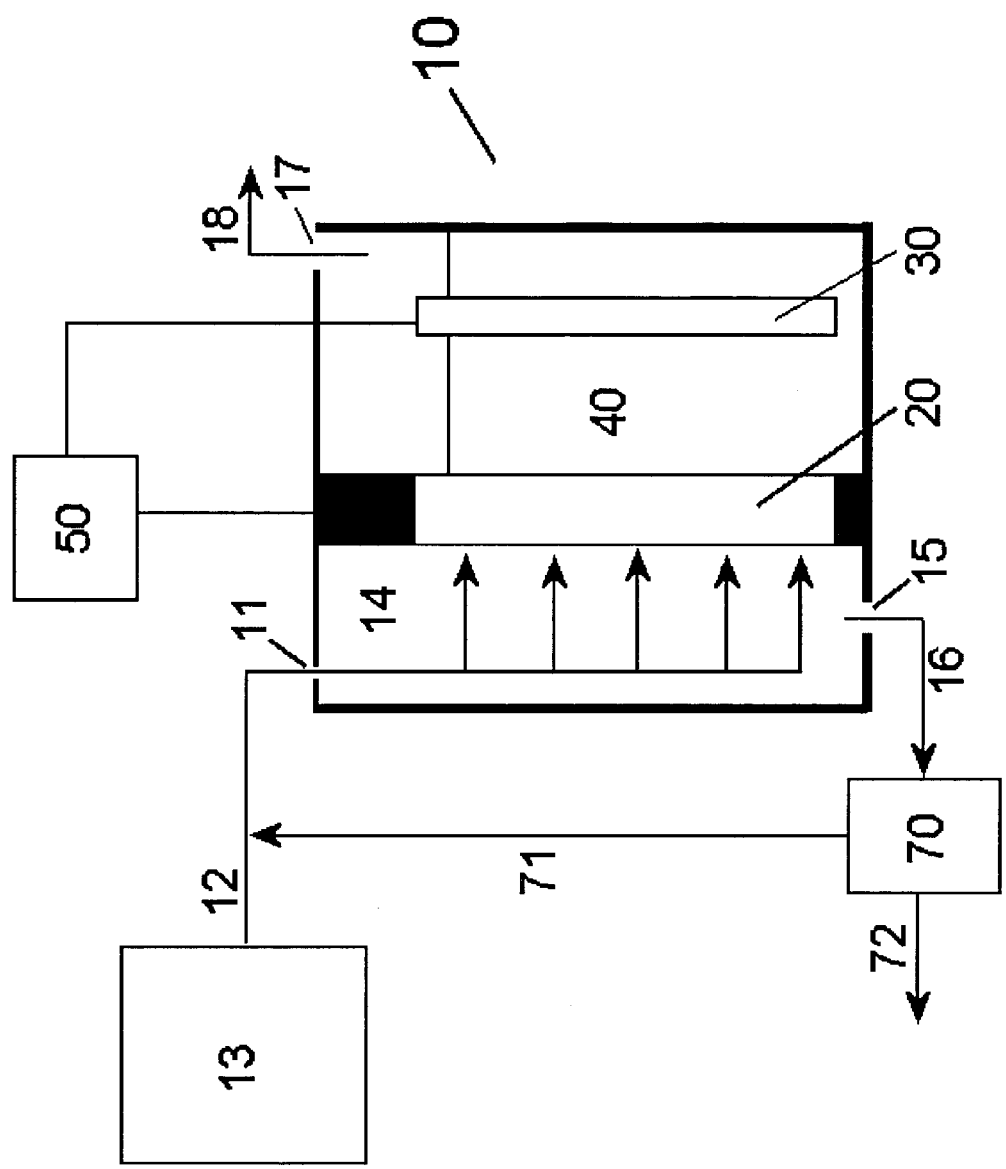
FIG. 5, is a depiction of a fourth embodiment of the present invention.

In a fourth embodiment of the present invention shown in FIG. 5, the contaminant rich gas stream 16 exiting the gas receiving chamber 14 may pass through a hydrogen separation system 70 which removes most of the contaminants from the contaminant rich gas stream 16 exiting the gas receiving chamber 14. The hydrogen separation 70 system may include metallic membranes, hydrogen permeable membranes, hydrogen getter materials, or any other means for separating a substantial amount of the contaminant gases from the hydrogen gas. In such case, the hydrogen rich stream 71 exiting the hydrogen separation system 70 is recycled into the impure hydrogen stream 12 entering the purification system and enters the gas receiving chamber 14 while the contaminant rich stream 72 is vented to the atmosphere or collected.

Figure 6:
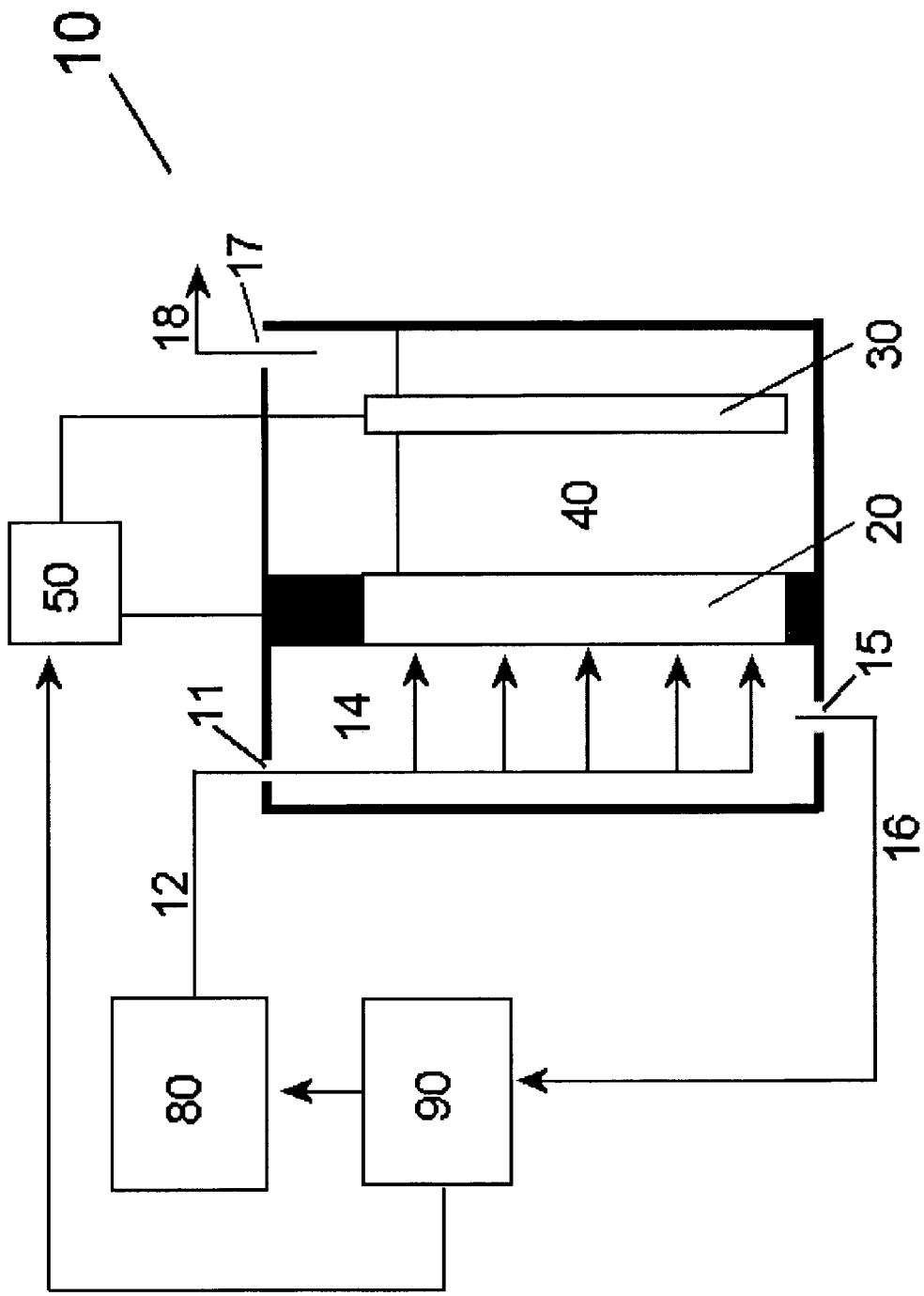
FIG. 6, is a depiction of a fifth embodiment of the present invention.

In a fifth embodiment of the present invention shown in FIG. 6, the purification system in accordance with the present invention may be used to purify an impure hydrogen stream supplied from a reformer 80. The reformer may produce hydrogen by processes such as catalytic steam reforming, autothermal reforming, or catalytic partial oxidation reforming all of which are fuel processing reforming processes whereby a fuel is heated up and subjected to a catalyst to liberate the hydrogen via cracking. Fuels used for reformation include organic compounds such as methane, methanol, or various hydrocarbons. The hydrogen produced in the reforming process may contain many contaminants such as carbon dioxide, carbon monoxide, methane, and various hydrocarbons or organic compounds. In such case, the contaminant rich gas stream 16 exiting the gas receiving chamber 14 may be fed to a combustor 90 and combusted to provide heat to the reformer for the reforming process and/or provide heat to a source of power such as a generator to generate an electrical current as needed to operate the electrodes. Prior to being combusted, the contaminant rich gas stream may be further processed using a second purification system, or a hydrogen separator as earlier described to remove more of the hydrogen from the contaminant stream.

The foregoing is provided for purposes of explaining and disclosing preferred embodiments of the present invention. Modifications and adaptations to the described embodiments, particularly involving changes to the shape of the vessel and the types of hydrogen storage alloy utilized in the cathode will be apparent to those skilled in the art. These changes and others may be made without departing from the scope or spirit of the invention in the following claims.

The invention claimed is:

1. A hydrogen purification system comprising:
    a gas receiving chamber receiving a gaseous stream of impure hydrogen;
    an alkaline solution;
    a gas diffusion anode adjacent to said gas receiving chamber having a gas interface in contact with said gaseous stream of impure hydrogen and an electrolyte interface in contact with said alkaline solution, said gas diffusion anode including a hydrogen storage alloy wherein hydrogen from said gaseous stream of impure hydrogen is absorbed into said hydrogen storage alloy; and
    an electrolytic cathode in contact with said alkaline solution, said electrolytic cathode receiving an electrical current and producing hydrogen upon receipt of said electrical current; and
    a source of power providing said electrical current to said electrolytic cathode.

2. The hydrogen purification system according to claim 1, wherein said gas receiving chamber comprises:
    an input for receiving said gaseous stream of impure hydrogen; and
    an output for venting an outlet stream containing contaminants from said stream of impure hydrogen and hydrogen not absorbed by said gas diffusion anode.

3. The hydrogen purification system according to claim 2, wherein said outlet stream is fed into a hydrogen separator, said hydrogen separator separating said outlet stream into a hydrogen stream containing mostly hydrogen and a waste stream containing mostly contaminants.

4. The hydrogen purification system according to claim 3, wherein said hydrogen stream is fed into said impure hydrogen stream and said waste stream is vented to the atmosphere or collected.

5. The hydrogen purification system according to claim 1, wherein said gas diffusion anode comprises a gas diffusion layer, an active material layer including said hydrogen storage alloy, and at least one current collector grid.

6. The hydrogen purification system according to claim 5, wherein said gas diffusion layer distributes said impure stream of hydrogen across said active material layer.

7. The hydrogen purification system according to claim 5, wherein said active material layer further comprises a material catalytic towards the dissociation of molecular hydrogen into atomic hydrogen.

8. The hydrogen purification system according to claim 1 wherein said hydrogen storage alloy is selected from rare-earth alloys, Misch metal alloys, zirconium and/or titanium alloys, magnesium/nickel alloys, or mixtures thereof.

9. The hydrogen purification system according to claim 1, wherein said current collector grid is a metal sheet, expanded metal, foil, wire mesh, screen, or combination thereof.

10. The hydrogen purification system according to claim 1, wherein said electrolytic cathode comprises a substrate with a material catalytic towards the decomposition of water to form hydrogen and hydroxyl ions deposited thereon.

11. The hydrogen purification system according to claim 10, wherein said catalytic material comprises a host matrix including one or more elements selected from Ni, Mo, Co, or combinations thereof.

12. The hydrogen purification system according to claim 11, wherein said catalytic material further comprises one or more modifier elements selected from Ti, Mo, Ta, Zn, Cr, Nb, Mn, Fe, V, Cu Sr, Si, La, Ce, O, Co, Al, C, Ru, Misch metal, Raney Nickel, or combinations thereof.

13. The hydrogen purification system according to claim 10, wherein said substrate is selected from a metal sheet, expanded metal, foil, wire mesh, screen, or combinations thereof.

14. The hydrogen purification system according to claim 10, wherein said substrate is formed from a material selected from nickel, steel, titanium, graphite, copper, or mixtures thereof.

15. The hydrogen purification system according to claim 1, wherein said gas diffusion anode is in electrical communication with said source of power thereby supplementing said source of power with an electrical current produced from the oxidation of said absorbed hydrogen at said electrolyte interface of said gas diffusion anode during operation.

16. A hydrogen production and purification system comprising:
    a hydrogen reformer producing a gaseous stream of impure hydrogen from a hydrogen containing organic compound;
    a source of heat providing heat to said hydrogen reformer to produce said gaseous stream of impure hydrogen;
    a gas receiving chamber receiving said gaseous stream of impure hydrogen;
    an alkaline solution;
    a gas diffusion anode adjacent to said gas receiving chamber having a gas interface in contact with said gaseous stream of impure hydrogen and an electrolyte interface in contact with said alkaline solution, said gas diffusion anode including a hydrogen storage alloy wherein hydrogen from said gaseous stream of impure hydrogen is absorbed into said hydrogen storage alloy; and
    an electrolytic cathode in contact with said alkaline solution, said electrolytic cathode receiving an electrical current and producing hydrogen upon receipt of said electrical current; and
    a source of power providing said electrical current to said electrolytic cathode.

17. The hydrogen purification system according to claim 16, wherein said gas receiving chamber comprises:
    an input for receiving said gaseous stream of impure hydrogen; and
    an output for venting an outlet stream containing contaminants from said stream of impure hydrogen and hydrogen not absorbed by said gas diffusion anode.

18. The hydrogen purification system according to claim 17, wherein said source of heat is a combustor fueled by said outlet stream.

19. The hydrogen purification system according to claim 17, wherein said source of power is a power generator powered by the combustion of said outlet stream.

20. The hydrogen purification system according to claim 17, wherein said outlet stream is fed into a hydrogen separator, said hydrogen separator separating said outlet stream into a hydrogen stream containing mostly hydrogen and a waste stream containing mostly contaminants.

21. The hydrogen purification system according to claim 16, wherein said gas diffusion anode comprises a gas diffusion layer, an active material layer including said hydrogen storage alloy, and at least one current collector grid.

22. The hydrogen purification system according to claim 21, wherein said gas diffusion layer distributes said impure stream of hydrogen across said active material layer.

23. The hydrogen purification system according to claim 16, wherein said hydrogen storage alloy is selected from rare-earth alloys, Misch metal alloys, zirconium and/or titanium alloys, magnesium/nickel alloys, or mixtures thereof.

24. The hydrogen purification system according to claim 16, wherein said hydrogen storage alloy comprises a material catalytic towards the dissociation of molecular hydrogen into atomic hydrogen.

25. The hydrogen purification system according to claim 16, wherein said electrolytic cathode comprises a substrate with a material catalytic towards the decomposition of water to form hydrogen and hydroxyl ions deposited thereon.

26. The hydrogen purification system according to claim 25, wherein said catalytic material comprises a host matrix including one or more elements selected from Ni, Mo, Co, or combinations thereof.

27. The hydrogen purification system according to claim 26, wherein said catalytic material further comprises one or more modifier elements selected from Ti, Mo, Ta, Zn, Cr, Nb, Mn, Fe, V, Cu Sr, Si, La, Ce, O, Co, Al, C, Ru, Misch metal, Raney Nickel, or combinations thereof.

28. The hydrogen purification system according to claim 16, wherein said gas diffusion anode is in electrical communication with said source of power thereby supplementing said source of power with an electrical current produced from the oxidation of said absorbed hydrogen at said electrolyte interface of said gas diffusion anode during operation.

29. The hydrogen production and purification system according to claim 16, wherein said hydrogen containing organic compound is natural gas.

30. A method for purifying an impure stream of hydrogen comprising the steps of:
    1) contacting a gas diffusion anode including a hydrogen storage alloy in contact with an alkaline electrolyte with an impure stream of hydrogen;
    2) absorbing hydrogen from said impure stream of hydrogen into said hydrogen storage alloy of said gas diffusion anode;
    3) oxidizing said absorbed hydrogen to release hydrogen ions into said alkaline electrolyte;
    4) supplying an electric current from a source of power to an electrolytic cathode in contact with said alkaline solution to produce a supply of pure hydrogen and hydroxyl ions; and
    5) collecting said supply of pure hydrogen.

* * * * *